United States Patent [19]
Chiappetti

[11] 3,834,734
[45] Sept. 10, 1974

[54] BICYCLE

[75] Inventor: Pietro Chiappetti, Los Angeles, Calif.

[73] Assignee: The Raymond Lee Organization, Inc., New York, N.Y. ; a part interest

[22] Filed: Feb. 13, 1973

[21] Appl. No.: 332,237

[52] U.S. Cl. ............................... 280/261, 280/281
[51] Int. Cl. .............................................. B62m 1/02
[58] Field of Search ............ 280/261, 266, 281, 273

[56] References Cited
UNITED STATES PATENTS

| | | | |
|---|---|---|---|
| 1,109,424 | 9/1914 | Kiefer | 280/273 X |
| 2,147,732 | 2/1939 | Boynton | 280/261 |
| 3,116,073 | 12/1963 | Ott et al. | 280/261 |
| 3,208,764 | 9/1965 | Holland | 280/266 X |

FOREIGN PATENTS OR APPLICATIONS

| | | | |
|---|---|---|---|
| 103,479 | 3/1938 | Australia | 280/261 |
| 480,622 | 2/1938 | Great Britain | 280/222 |
| 744,065 | 1/1933 | France | 280/261 |

Primary Examiner—Leo Friaglia
Attorney, Agent, or Firm—Howard I. Podell

[57] ABSTRACT

An improved bicycle in which the wheels are spaced considerably apart to increase riding comfort, with driving pedals mounted above the centerline of the bicycle driving wheel to permit the legs of the rider to rest at an acute angle to the horizontal plane. Steering means may be provided in proximity to the seat of the rider, utilizing a cable connection between the steering means and the front steering wheel, or alternately a rotatable steering shaft may extend from the front steering wheel to the position of the seated driver, with said rotatable shaft being geared to the fork of the front steering bicycle wheel so as to steer the bicycle wheel in response to rotation of the steering shaft.

2 Claims, 3 Drawing Figures

PATENTED SEP 10 1974 3,834,734

BICYCLE

SUMMARY OF THE INVENTION

This invention relates to an improved bicycle and particularly to a bicycle in which the wheels are spaced considerably apart to improve riding performance.

An advantage of this improved bicycle is that the pedals are located above the center of the bicycle wheels to permit the feet of the rider to lie close to the horizontal plane in operation. The bicycle seat is lower, than customary, which lowers the center of gravity of the improved bicycle and improves the safety to the rider, as contrasted with conventional bicycles. The bicycle seat is fitted with a back rest for the comfort of the rider.

Steering means may include a cable drive from the front steering wheel of the bicycle to a steering handle mounted in the proximity of the driver's seat. Alternately, a rotatable steering rod, may be employed, with the steering rod geared so as to rotate the axle of the front steering wheel when the steering shaft is rotated about its axis.

The bicycle of this invention spaces the bicycle wheels further apart than in conventional bicycles, with the center of the two wheels being spaced by a distance of three times the diameter of the rear driving bicycle wheel. The increased space between wheels permits the seat mounting to be lowered since the seat mounting is located forward of the rear bicycle wheel.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
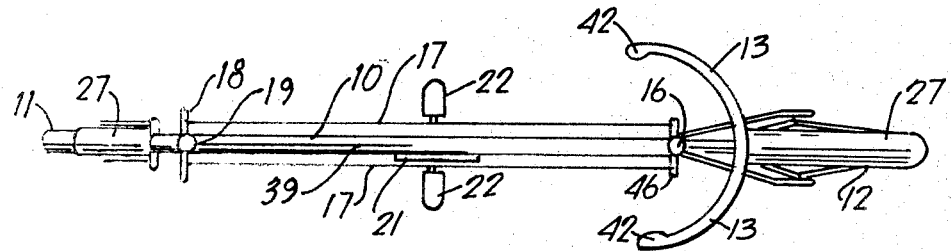
FIG. 1 is a plan view of the improved bicycle.
Figure 2:
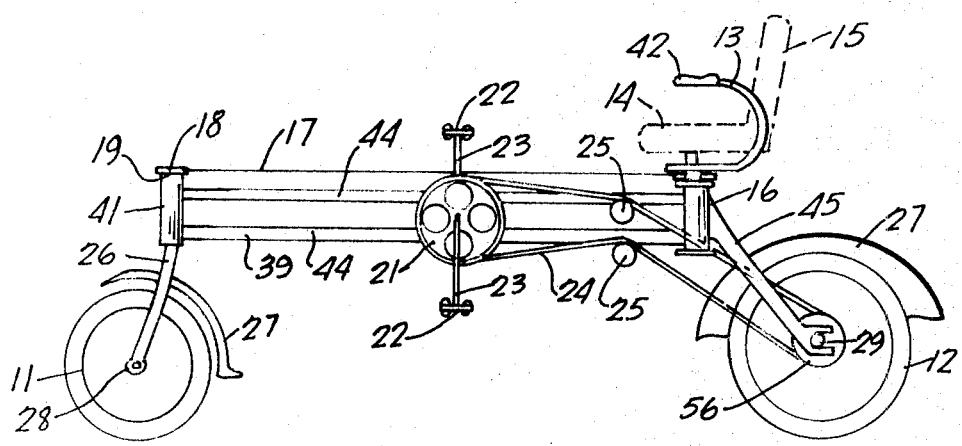
FIG. 2 is an elevation view of the improved bicycle.

Turning now descriptively to the drawings, in which similar reference characters denote similar elements throughout the several views, and in which terms of orientation and direction such as "above" "below," "vertical" and "horizontal" will refer to the bicycle in the erect position shown in FIGS. 1–3. FIGS. 1–2 illustrates the improved bicycle 10, with the front steering bicycle wheel 11 being of smaller diameter than the rear driving wheel 12, with both wheels partially enclosed by flared mudguards 27.

The axle 28 of the front wheel 11 is separated from the axle 29 of the rear wheel 12 by a distance that is greater than three times the diameter of the rear wheel 12 so as to improve the comfort of the ride.

The fork 26 supporting the front wheel axle 28 is mounted in the bicycle frame 39 so as to be free to rotate is the vertical plane, with an extension pin 19 protruding above the frame bearing 41. Pin 19 is fixed to steering rod 18 which extends horizontally on each side of the pin 19, so that steering cables 17, which join each side of steering rod 18 may apply steering torque to rotate the fork 26 and the direction of front wheel 11. The two steering cables 17 connect each side of the steering rod 18 with the respective side of the tiller rod 46, tiller rod 46 being fixed to a rotatable shaft that is mounted in the vertical plane of the bicycle frame 39, and located adjacent to or concentric with driver seat mounting 16.

The tiller rod 46 is fixed to the tiller arms 13 which are of a curved shape extending behind the bicycle seat mounting 16, with each side tiller arm 13 terminating in a hand grip 42 located above the bicycle seat 14. Bicycle seat 14 is fixed to seat mounting 16. Rotation of a tiller arm 13, by the manual grasping of a hand grip 42, applies steering torque to front wheel 11 through steering cables 17.

A drive chain 24 is mounted about a sprocket 56 fixed to rear wheel axle 29, and extends over idler sprockets 25 to drive sprocket wheel 21. Sprocket wheel 21 is located midway between the front wheel fork mounting 41 and the rear seat mounting 16 and is at the height of both mountings. The front wheel mounting 41 and the rear seat mounting 16 are of generally similar height being joined by two parallel horizontal frame members 44. The mounting of the drive sprocket wheel 21 is fastened to one or to both horizontal frame members 44.

Pedal arms 23 are fixed to the axle shaft to which sprocket wheel 21 is joined, with each pedal arm 23 being on opposing sides of the bicycle frame 39, and with pedals 22 being rotatably mounted to each pedal arm in conventional fashion.

Rear wheel 12 is supported by fixed fork 45 to seat mounting 16, with the axis of fork 45 being at an angle to the perpendicular so as to permit seat mounting 16 to extend below the top of the rear wheel 12.

Seat 14 is fitted into seat mounting 16 with adjustable means to set the height of the seat 14. A back seat 15 is fixed either directly to the seat 14, or to the seat mounting 16 to provide comfort to the seated rider.

Figure 3:
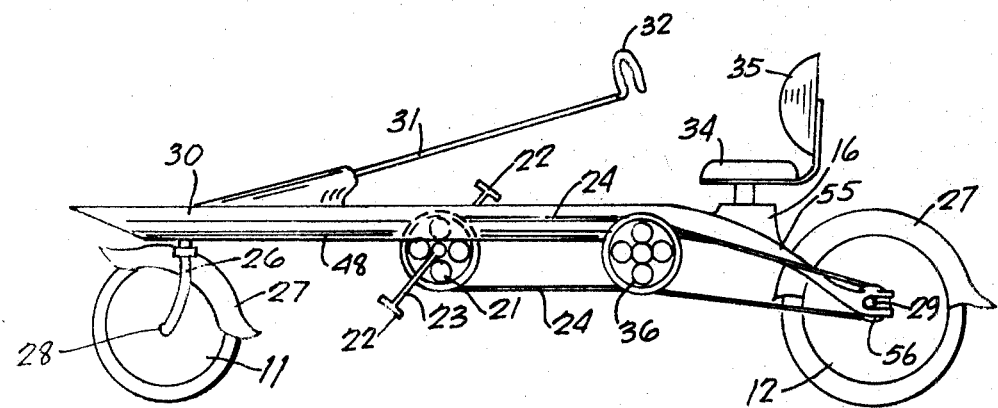
FIG. 3 is an elevation view of an alternate form of the improved bicycle.

An alternate form of the invention is shown in FIG. 3 in which bicycle 30 features a unitary frame member 48 extending in a horizontal plane from a position ahead of forward wheel 11 to just forward of the seat mounting 16, and then extending in a downwards direction at an acute angle to the horizontal plane, dividing to become the rear wheel fork 55 that supports rear axle 29. Drive chain 24 is mounted about drive sprocket wheel 21, the free rotating wheel 36 and the rear wheel sprocket 56.

The fork 26 supporting front wheel 11 is joined by gears to the steering shaft 31, such that rotation of steering shaft 31, by means of handholds 32, acts to rotate fork 26 of front wheel 11 so as to steer bicycle 30.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An improved bicycle in which the wheels are spaced considerably apart to increase riding comfort, said spacing between the axles of the wheels being greater than three times the diameter of the rear driving bicycle wheel, in which a relatively straight frame member connects the mounting of the forward wheel fork member and the rear mounting of the bicycle seat, said frame member lying in a generally horizontal plane when the bicycle is in the erect position, with said seat being mounted on said frame member directly forward of the rear driving wheel and equipped with a back rest which is mounted in a general vertical position with respect to the top surface of the said seat;

said bicycle being powered by the rotation of a pedal sprocket wheel, the axle of which is rotatably fixed to the relatively straight frame member joining the mounting of the forward wheel fork and the mounting of the said seat, with the axle of the pedal sprocket shaft located generally midway between the mounting of the front wheel fork and the mounting of the said seat;

the steering linkage to the front wheel fork including a pair of cables which are joined to a steering arm rotatably mounted in the horizontal plane about the axis of the seat mount.

2. The combination as recited in claim 1, in which the steering arm extends to the rear of the seat mounting and about both sides of the seat mounting.

* * * * *